US 8,987,963 B2

(12) United States Patent
Kusase et al.

(10) Patent No.: US 8,987,963 B2
(45) Date of Patent: Mar. 24, 2015

(54) DOUBLE DRIVE SHAFT MOTOR OF MAGNETIC FLUX MODULATION TYPE

(71) Applicant: Denso Corporation, Kariya (JP)

(72) Inventors: Shin Kusase, Obu (JP); Akira Fukushima, Kariya (JP)

(73) Assignee: Denso Corporation, Kariya (JP)

( * ) Notice: Subject to any disclaimer, the term of this patent is extended or adjusted under 35 U.S.C. 154(b) by 233 days.

(21) Appl. No.: 13/741,859

(22) Filed: Jan. 15, 2013

(65) Prior Publication Data

US 2013/0193782 A1    Aug. 1, 2013

(30) Foreign Application Priority Data

Jan. 30, 2012  (JP) ................................. 2012-016049

(51) Int. Cl.
| H02K 16/00 | (2006.01) |
| H02K 16/02 | (2006.01) |
| H02K 1/06 | (2006.01) |
| H02K 51/00 | (2006.01) |
| H02K 7/11 | (2006.01) |
| H02K 7/112 | (2006.01) |

(52) U.S. Cl.
CPC .................. *H02K 1/06* (2013.01); *H02K 16/00* (2013.01); *H02K 16/02* (2013.01); *H02K 51/00* (2013.01); *H02K 7/11* (2013.01); *H02K 7/112* (2013.01)
USPC ........................ 310/114; 310/156.36; 310/266

(58) Field of Classification Search
CPC ................................ H02K 16/00; H02K 16/02
USPC ................ 310/112–114, 156.36–156.37, 266
See application file for complete search history.

(56) References Cited

U.S. PATENT DOCUMENTS

| 7,626,298 | B2 * | 12/2009 | Atarashi ........................ 310/114 |
| 7,649,292 | B2 * | 1/2010 | Moriya et al. ................. 310/114 |
| 8,183,722 | B2 * | 5/2012 | Akutsu et al. .................... 310/46 |
| 8,350,442 | B2 * | 1/2013 | Akutsu et al. ................. 310/266 |
| 2006/0226722 | A1 * | 10/2006 | Kim et al. ...................... 310/114 |

(Continued)

FOREIGN PATENT DOCUMENTS

| JP | 11-164535 | 6/1999 |
| JP | 2010-070137 | 4/2010 |

(Continued)

OTHER PUBLICATIONS

Office Action (2 pgs.) dated Feb. 4, 2014 issued in corresponding Japanese Application No. 2012-016049 with an at least partial English-language translation thereof (3 pgs.).

*Primary Examiner* — Thanh Lam
(74) *Attorney, Agent, or Firm* — Nixon & Vanderhye PC

(57) ABSTRACT

In a double drive shaft motor, a stator and a field rotor are arranged at a radially outer side of a magnetic modulation rotor. The stator and the field rotor are arranged in series in an axial direction of the motor. This structure increases an amount of a winding coil of the stator and magnets in the field rotor, and an output torque of the motor. When a field magnetic flux passes through soft magnetic material members in the magnetic modulation rotor, because the generation and the reception of the magnetic flux can occur at a radially same side of the magnetic modulation rotor, this structure cancels an eddy current generated in the soft magnetic members and supporting members made of non-magnetic metal which tightly support the soft magnetic member. This structure provides a reduced axial size of the motor with high performance.

11 Claims, 9 Drawing Sheets

(56) References Cited

U.S. PATENT DOCUMENTS

2008/0211335 A1* 9/2008 Abe et al. ............. 310/103
2010/0308674 A1* 12/2010 Kasaoka et al. ......... 310/114
2011/0001364 A1* 1/2011 Oya et al. ............ 310/12.15
2011/0109180 A1 5/2011 Akutsu et al.

FOREIGN PATENT DOCUMENTS

JP 2010-81753 4/2010
JP 4505524 4/2010

* cited by examiner

AXIAL DIRECTION (A-A)

(B-B)

1

DOUBLE DRIVE SHAFT MOTOR OF MAGNETIC FLUX MODULATION TYPE

CROSS-REFERENCE TO RELATED APPLICATION

This application is related to and claims priority from Japanese Patent Application No. 2012-16049 filed on Jan. 30, 2012, the contents of which are hereby incorporated by reference.

BACKGROUND OF THE INVENTION

1. Field of the invention

The present invention relates to double drive shaft motors of a magnetic flux modulation type, to be mounted on hybrid vehicles such as hybrid electric vehicles and used as a drive motor therefor, having an improved structure capable of converting rotation speed and torque of power between two power machines, and for executing an electric power division control such as addition and subtraction of the power.

2. Description of the Related Art

There have been proposed various types of rotary machines capable of converting a high-speed rotation power generated by an internal combustion engine to a low-speed rotation power by gradually changing a transmission gear ratio in a transmission device. For example, Japanese patent No. JP 4505524 discloses a conventional technique of a power machine capable of executing a power transmission on the basis of magnetic gears of a magnetic flux modulation type. The conventional power machine disclosed in Japanese patent No. JP 4505524 has high energy conversion efficiency because of having to convert magnetic flux to current a smaller number of times.

However, the conventional power machine disclosed in Japanese patent No. JP 4505524 has a conventional structure composed of a stator, a magnetic modulation rotor and a field rotor which are coaxially arranged to each other. That is, the stator generates a rotating magnetic field. The magnetic modulation rotor is made of soft magnetic material. The field rotor has permanent magnets. Further, the stator and the field rotor are arranged in a nested structure so that the stator and the field rotor are arranged in a nested structure through the magnetic modulation rotor. This structure limits the size of the field rotor in the conventional power machine, and it becomes difficult to produce a strong field magnetic force.

In addition, when the size of the stator is decreased in order to increase the field magnetic force of the field rotor, this decreases the overall amount of the stator winding wound in the stator, and as a result, decreases the magnitude of generated torque. The generated torque is determined by the product of the field magnetic flux of the field rotor and the amount of the stator winding of the stator.

Still further, it is difficult to adequately fix the soft magnetic material of the magnetic modulation rotor because a magnetic flux penetrates through the soft magnetic material. That is, in addition to the generation of an eddy current in the inside of the soft magnetic material, the soft magnetic material acts as a short-circuit coil in a squirrel-cage induction motor when the outer periphery of the soft magnetic material is fixed by a supporting member made of metal. In order to avoid this drawback, the conventional technique uses a structure in which the soft magnetic material is fixed by an insulation member made of rigid resin or hard resin in order to interrupt a passage of the short-circuit coil. However, the conventional structure using such an insulation member is relatively weakly attached to the magnetic modulation rotor made of the soft magnetic material.

Still further, because the electric rotary machine having the structure previously described has the nested structure of the stator, the magnetic modulation rotor and the field rotor, it is necessary to make a magnetic circuit in an allowable space in which the field rotor is arranged at the innermost position in order to increase the magnetic force. Accordingly, it is difficult to arrange additional members such as bearings and rotation position detection sensors, and further difficult to form any additional space through which cooling air flows in addition to the rotating shaft in the inside of the field rotor in the conventional power machine previously described.

SUMMARY

It is therefore desired to provide a double drive shaft motor of a magnetic flux modulation type having reduced size and loss and with high performance.

An exemplary embodiment provides a double drive shaft motor of a magnetic flux modulation type. The double drive shaft motor has a magnetic modulation rotor, a stator, and a field rotor. The magnetic modulation rotor has a plurality of soft magnetic material members. The soft magnetic material members form magnetic flux paths arranged at regular intervals in a circumferential direction of the magnetic modulation rotor. The stator has a multi-phase winding of m magnetic poles, where m is an even number. The multi-phase winding faces the magnetic modulation rotor and is arranged at a radially inner side or a radially outer side of the magnetic modulation rotor so that the stator faces the magnetic modulation rotor. The field rotor has a plurality of n field magnetic poles, where, n is an even number. The field magnetic poles are arranged at a radially same side of the stator, as the magnetic modulation rotor so that the field rotor and the stator are axially arranged in series.

The soft magnetic material members of the magnetic modulation rotor are arranged along a circumferential direction of the magnetic modulation rotor at regular intervals to radially face the stator and the field rotor. The stator, the field rotor and the magnetic modulation rotor satisfy the following relationship: $k=(m+n)/2$, ... (1), where k is the number of the soft magnetic material members.

In a double drive shaft motor of a magnetic flux modulation type as another aspect of the present invention, a magnetic modulation rotor has a plurality of soft magnetic material members. The soft magnetic material members form magnetic flux paths arranged at regular intervals in a circumferential direction of the magnetic modulation rotor. A stator has a multi-phase winding of m magnetic poles, where m is an even number. The multi-phase winding faces the magnetic modulation rotor and is arranged at a radially inner side or a radially outer side of the magnetic modulation rotor so that the stator faces the magnetic modulation rotor. A field rotor has a plurality of n field magnetic poles, where, n is an even number. The field magnetic poles are arranged at an axially end surface of the magnetic modulation rotor so that the field rotor and the stator are axially arranged in series. The soft magnetic material members of the magnetic modulation rotor are arranged along a circumferential direction of the magnetic modulation rotor at regular intervals to radially face the stator and the field rotor. The stator, the field rotor and the magnetic modulation rotor satisfy the following relationship: $k=(m+n)/2$, ... (1), where k is the number of the soft magnetic material members.

In the structure of the double drive shaft motor according to the exemplary embodiment of the present invention previously described, the stator and the field rotor are arranged at the radially same side (namely, at a radially inner side or a radially outer side) viewed from the magnetic modulation rotor. In other words, the double drive shaft motor according to the exemplary embodiment of the present invention does not have any nested structure in which the stator and the field rotor are coaxially arranged so that the stator and the field rotor accommodate the magnetic modulation rotor.

This structure prevents the size of the magnetic modulation rotor in the double drive shaft motor from being decreased. This structure allows the double drive shaft motor to have an increased amount of the stator winding in the stator and a large number of magnets in the field rotor. As a result, this makes it possible to output a large output torque and power.

Still further, because the structure previously described makes it possible to form a space at a radially inner side or a radially outer side of the magnetic modulation rotor where the stator and the field rotor are not arranged, it is possible to arrange a bearing, a transmission device and etc., in this space or to use this space as air flow passage through which cooling air passes. This structure makes it possible to enhance the entire performance of the double drive shaft motor.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
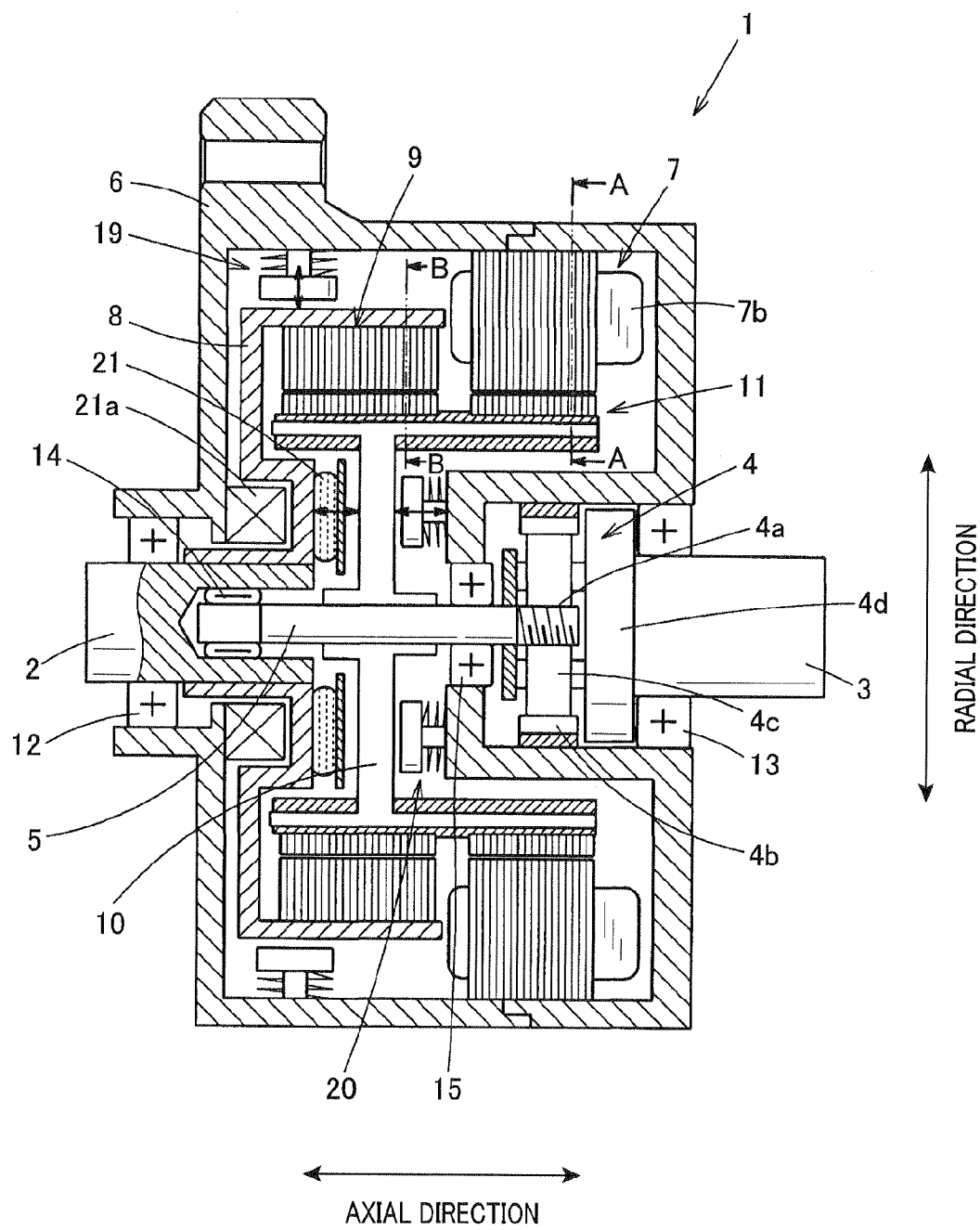
FIG. 1 is a view showing a vertical cross section of a double drive shaft motor according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.
First Exemplary Embodiment A description will be given of a double drive shaft motor of a magnetic flux modulation type according to the first exemplary embodiment of the present invention with reference to FIG. 1 to FIG. 7.

FIG. 1 is a view showing a vertical cross section of the double drive shaft motor according to the first exemplary embodiment of the present invention.

As shown in FIG. 1, the double drive shaft motor 1 according to the first exemplary embodiment has a first rotating shaft 2, a second rotating shaft 3, a third rotating shaft 5, a stator 7, a field rotor 9, a magnetic modulation rotor 11, etc.

The first rotating shaft 2 receives a rotational power transmitted from an internal combustion engine of a hybrid vehicle (not shown). When receiving the rotational power, the first rotating shaft 2 rotates. The second rotating shaft 3 is engaged with a wheel drive system. The third rotating shaft is engaged with the second rotating shaft 3 through a reduction gear device 4. The stator 7 is fixed to a motor housing casing 6. The field rotor 9 is engaged with the first rotating shaft 2 through a rotor arm 8. The magnetic modulation rotor 11 is engaged with the third rotating shaft 5 through a rotor disk 10.

The first rotating shaft 2 and the second rotating shaft 3 are arranged in the same axial line and supported to the motor housing casing 6 through bearings, respectively.

One end section (at the left side in FIG. 1) in an axial direction of the third rotating shaft 5 is inserted into and rotatably arranged in an inner periphery of a hollow section formed in the first rotating shaft 2 through a bearing 14. The other end section in an axial direction of the third rotating shaft 5 is supported by the motor housing casing 6 through a bearing 15.

The reduction gear 4 is a transmission device composed of a known planetary gear mechanism. The planetary gear mechanism is composed of a sun gear 4a, a ring gear 4b (an internal gear), a planetary gear 4c and a planetary carrier 4d. The sun gear 4a is arranged at the end section of the third rotating shaft 5 which projects from the bearing 15 toward the right side shown in FIG. 1. The ring gear 4b is coaxially arranged with the sun gear 4a. The planetary gear 4c is engaged with the sun gear 4a and the ring gear 4b. The planetary carrier 4d supports the planetary gear 4c. The planetary carrier 4d and the second rotating shaft 3 are assembled together.

Figure 2:
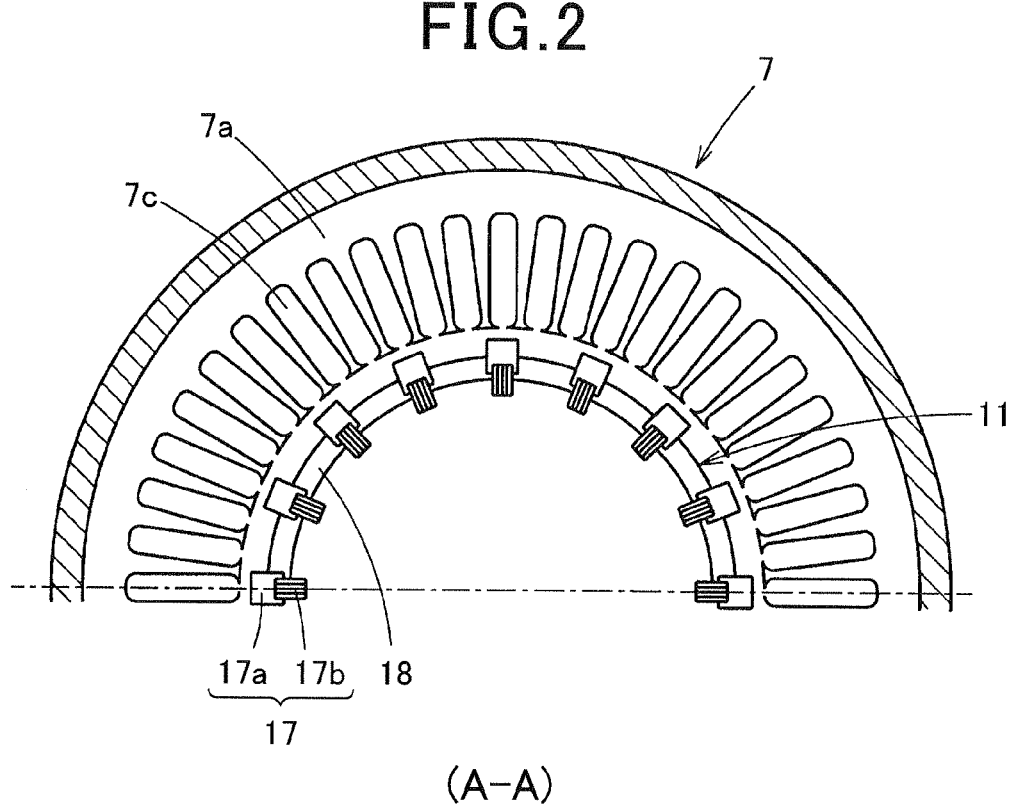
FIG. 2 is a cross section of a stator and a magnetic modulation rotor in the double drive shaft motor according to the first exemplary embodiment along the A-A line shown in FIG. 1.

FIG. 2 is a cross section of the stator 7 and the magnetic modulation rotor 11 in the double drive shaft motor 1 according to the first exemplary embodiment along the A-A line shown in FIG. 1.

As shown in FIG. 2, the stator 7 is composed of a stator core 7a having a ring shape and three phase winding 7b (see FIG. 1) wound around the stator core 7a. The three phase winding 7b has twelve magnetic poles. As shown in FIG. 2, a plurality of slots 7c is formed in the inner circumferential section of the stator core 7a at regular pitches in a circumferential direction of the stator core 7*a*. The three phase winding 7*b* are inserted into and wound around the slots 7*c*.

Figure 3:
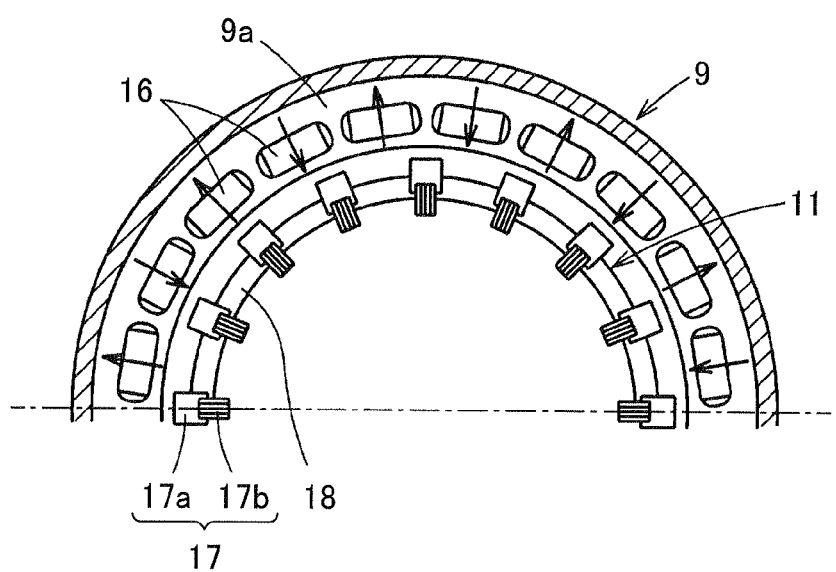
FIG. 3 is a cross section of the field rotor and the magnetic modulation rotor in the double drive shaft motor according to the first exemplary embodiment along the B-B line shown in FIG. 1.

FIG. 3 is a cross section of the field rotor 9 and the magnetic modulation rotor 11 in the double drive shaft motor 1 according to the first exemplary embodiment along the B-B line shown in FIG. 1.

As shown in FIG. 3, the field rotor 9 is composed of a rotor core 9*a* having a ring shape and twenty rare earth magnets 16. Each rare earth magnet is made of neodymium magnet, for example, and embedded in the rotor core 9*a*.

The twenty rare earth magnets 16 are arranged in the rotor core 9*a* at regular intervals in a circumferential direction of the rotor core 9*a*. Each rare earth magnet 16 is magnetized in a radial direction designated by the arrows shown in FIG. 3. As shown in FIG. 3, the adjacent rare earth magnets 16, which are adjacent in a circumferential direction, have an opposite magnetic polarity. That is, the north magnetic pole (N pole) and the south magnetic pole (S pole) are alternately arranged in a circumferential direction of the rotor core 9*a*.

As shown in FIG. 1, the field rotor 9 and the stator 7 are axially arranged close to each other in an axial direction of the double drive shaft motor 1.

The magnetic modulation rotor 11 is arranged at the radially inside of the stator 7 and the field rotor 9. As shown in FIG. 2 and FIG. 3, the magnetic modulation rotor 11 is composed of soft magnetic material members 17 and supporting members 18. Each supporting member 18 supports the corresponding soft magnetic material member 17. That is, each soft magnetic material member 17 and the corresponding supporting member 18 make a pair.

Twelfth magnetic flux paths are formed at regular intervals in a circumferential direction of the magnetic modulation rotor 11. Each magnetic flux path is made by the soft magnetic material member 17. Each soft magnetic material member 17 is made of a first lamination member 17*a* and a second lamination member 17*b*. The first lamination member 17*a* is made of a plurality of magnetic steel plates stacked in an axial direction. The second lamination member 17*b* is made of a plurality of magnetic steel plates stacked in a circumferential direction.

The first lamination member 17*a* is arranged at a radially outer side of the magnetic modulation rotor 11 to face the stator 7 and the field rotor 9. The second lamination member 17*b* is arranged at a radially inner side of the magnetic modulation rotor 11. That is, the soft magnetic material member 17 and the second lamination member 17*b* intersect to each other and are in contacted with to each other, Each supporting member 18 is made of stainless steel, for example, in order to tightly fix the corresponding soft magnetic material member 17. The soft magnetic material member 17 is composed of the first lamination member 17*a* and the second lamination member 17*b*.

A field rotor stop device 19 (as a first stop device) is arranged between the motor housing casing 6 and the field rotor 9. The field rotor stop device 19 supports the field rotor 9 when the rotation of the field rotor 9 is stopped in the motor housing casing 6.

Further, a magnetic modulation rotor stop device 20 (as a second stop device) is arranged between the motor housing casing 6 and the magnetic modulation rotor 11. The magnetic modulation rotor stop device 20 supports the magnetic modulation rotor 11 when the rotation of the magnetic modulation rotor 11 is stopped in the motor housing casing 6.

Still further, a connection device 21 is arranged between the field rotor 9 and the magnetic modulation rotor 11 in order to connect the field rotor 9 with the magnetic modulation rotor 11.

The field rotor stop device 19 and the magnetic modulation rotor stop device 20 operate under a stop mode and a stop release mode. A control device (not shown) supplies a current to a control coil, and halts the current supply to the control coil. That is, the control device switches a turned-on state and a turned-off state of the current supply to the control coil in order to switch the stop mode and the release mode. The stop mode stops the rotation of each of the field rotor stop device 19 and the magnetic modulation rotor stop device 20. The release mode allows the field rotor stop device 19 and the magnetic modulation rotor stop device 20 to rotate.

Further, the field rotor 9 and the magnetic modulation rotor 11 operate under a connection mode and a connection release mode. The control device (not shown) switches the connection mode and the connection release mode. The connection mode connects the field rotor stop device 19 with the magnetic modulation rotor stop device 20. The connection release mode releases the connection between the field rotor stop device 19 and the magnetic modulation rotor stop device 20.

That is, the control device (not shown) supplies a current to a control coil 21*a* in order to execute the connection mode. Further, the control device (not shown) halts the current supply to the control coil 21*a* in order to execute the connection release mode.

Because FIG. 1 shows a schematic view of the field rotor stop device 19, the magnetic modulation rotor stop device 20 and the connection device 21, the concept of them is not limited by the disclosure shown in FIG. 1. It is possible for the field rotor stop device 19, the magnetic modulation rotor stop device 20 and the connection device 21 to have another arrangement configuration.

(Magnetic Modulation)

A description will now be given of the magnetic modulation of the magnetic modulation rotor 11 in the double drive shaft motor 1 according to the first exemplary embodiment with reference to FIG. 4.

Figure 4:
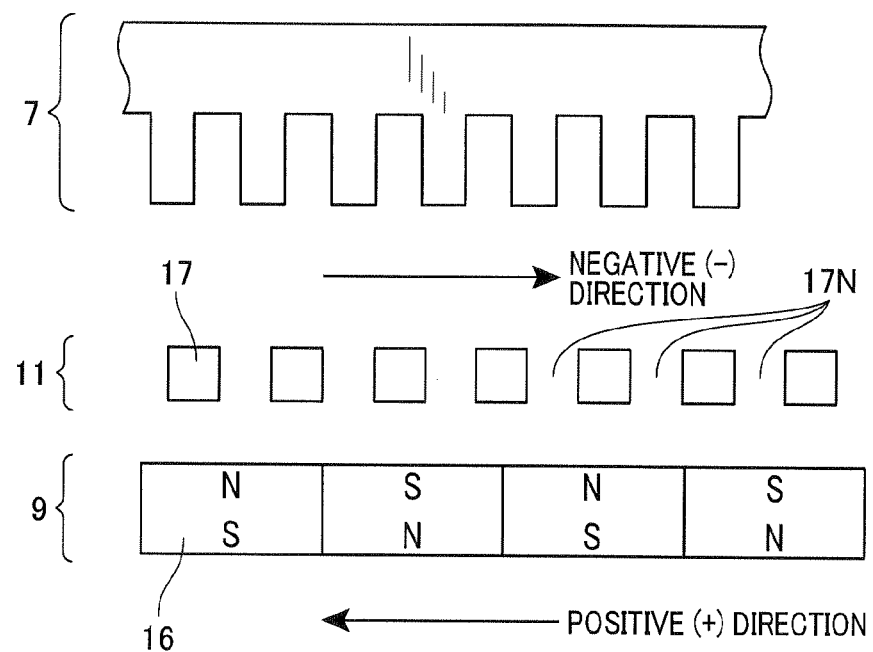
FIG. 4 is a view showing a principle of magnetic modulation used in the double drive shaft motor according to the first exemplary embodiment of the present invention.

FIG. 4 is a view showing a principle of the magnetic modulation of the magnetic modulation rotor 11 in the double drive shaft motor 1 according to the first exemplary embodiment of the present invention.

As shown in FIG. 4, the field rotor 9 has the twenty rare earth magnets 16. The stator 7 has the three phase winding 7*b* (omitted from FIG. 4) which is wound in a pitch to form twelve magnetic poles. The magnetic modulation rotor 11 has the sixteen soft magnetic material members 17 which are arranged in a circumferential direction at regular intervals between the field rotor 9 and the stator 7. FIG. 4 shows a part of the soft magnetic material members 17 arranged in a straight line, for brevity.

The twenty rare earth magnets 16 have a distribution of a field magnetic flux which generates an alternating magnetic field and supplies the alternating magnetic field ten times (f1 times) per circumference to the stator 7. Because the sixteen soft magnetic material members 17 having the magnetic flux paths and sixteen magnetic non-flux paths 17N are alternately arranged between the stator 7 and the magnetic modulation rotor 11, a cycle of a magnetic shield state and a magnetically conductive state occurs sixteen times (f2 times) per circumference in the alternating magnetic field. That is, the magnetic modulation is generated in the alternating magnetic field.

As widely known by modulation theory (regarding a formula of product and sum of a trigonometric function), the magnetic field, which reaches the stator 7 and is returned by the stator 7, has two frequency components such as a difference component (f1−f2) and a sum component (f1+f2). When the three phase winding 7*b* is wound to make twelve magnetic poles the alternating magnetic field six times (f3 times) per circumference, it becomes possible to execute energy conversion in synchronism with the difference component (f1−f2). This makes it possible to generate and supply a magnetic torque to the stator 7. The reaction to the generated magnetic torque is supplied to the field rotor 9 and the magnetic modulation rotor 11. In other words, the interaction is generated between the stator 7, the field rotor 9 and the magnetic modulation rotor 11.

It is noted that the number of the magnetic poles in the stator 7, when the number of the magnetic poles in the field rotor 9 and the magnetic modulation rotor 11 is selected so that the difference takes a negative value, in other words, for example, when the magnetic modulation rotor 11 is fixed, it is possible to generate that the rotational direction of magnetic field in a difference frequency component to be in synchronization with the magnetic field in the stator 7 becomes an opposite direction to the rotational direction of magnetic field generated in the field rotor 9. The double drive shaft motor 1 according to the first exemplary embodiment is designed to have this relationship in rotational direction of the magnetic field between the stator 7, the field rotor 9 and the magnetic modulation rotor 11.

To reverse the direction of the magnetic field means that the sun to gear 4a and the ring gear 4b can have a different rotational direction when the revolution of the planetary gear 4c is fixed. That is, this indicates that the sun gear 4a, the ring gear 4b and the planetary gear 4c make a collinear relationship.

A description will now be given of a phenomenological operation model regarding the magnetic modulation in the double drive shaft motor 1 according to the first exemplary embodiment with reference to FIG. 5A to FIG. 5E.

FIG. 5A to FIG. 5E are views showing the principle of magnetic modulation on the basis of an operation model of the double drive shaft motor 1 according to the first exemplary embodiment of the present invention.

FIG. 5A to FIG. 5E show a structure of the double drive shaft motor 1 in which the field rotor 9 has the two magnetic poles, the magnetic modulation rotor 11 has the four magnetic poles, and the stator 7 has the six magnetic poles, for brevity in explanation. Further, the magnetic modulation rotor 11 is fixed in the double drive shaft motor 1.

Figure 5E:
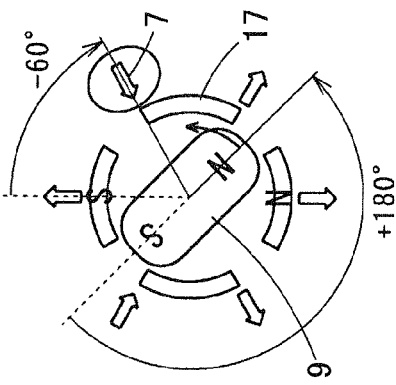
FIG. 5A to FIG. 5E are views showing the principle of magnetic modulation on the basis of an operation model of the double drive shaft motor according to the first exemplary embodiment of the present invention.
Figure 5D:
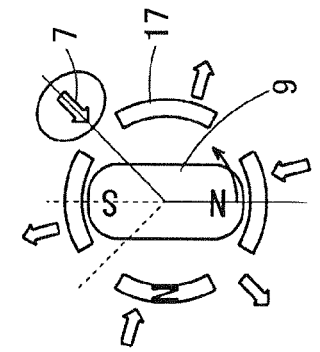
Figure 5C:
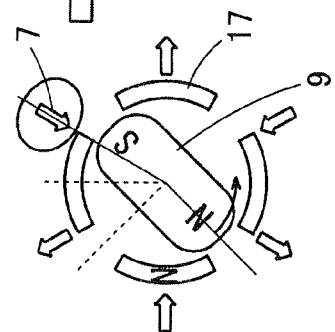
Figure 5B:
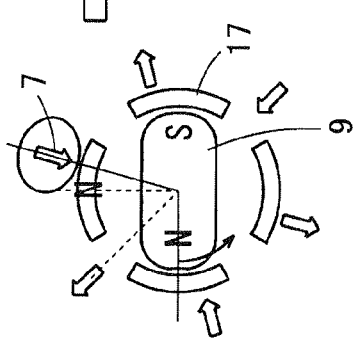
Figure 5A:
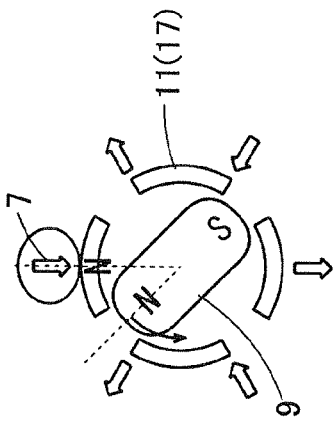

First, in the positional relationship between the stator 7, the field rotor 9 and the magnetic modulation rotor 11 shown in FIG. 5A, when a magnetic field is generated in the stator 7, the soft magnetic material member 17 in the magnetic modulation rotor 11, which is close in position to a magnetic field designated by a white arrow enclosed with a circle, is magnetically induced to a north magnetic pole. The magnetic north pole of the field rotor 9 close to the soft magnetic material members 17 starts to rotate in a counterclockwise direction by the repulsion to the magnetic induction in the soft magnetic material members 17.

Next, in the positional relationship between the stator 7, the field rotor 9 and the magnetic modulation rotor 11 shown in FIG. 5B, when the magnetic field of the stator 7 slightly rotates in a clockwise direction from the position shown in FIG. 5A, the soft magnetic material members 17 in the magnetic modulation rotor 11 have a magnetic north pole which is slightly weaker than the magnet north pole of the soft magnetic material members 17 at the position shown in FIG. 5A. That is, the field rotor 9 rotates to the position at which the field rotor 9 completely crosses at right angles to the soft magnetic material members 17 in the magnetic modulation rotor 11.

Further, in the positional relationship between the stator 7, the field rotor 9 and the magnetic modulation rotor 11 shown in FIG. 5C, because the soft magnetic material members 17 in the magnetic modulation rotor 11, which faces the magnetic north pole of the field stator 9, is magnetically induced to the magnetic north pole, the field rotor 9 rotates the counterclockwise direction by a large repulsion force.

As described above, when the stator 7 rotates in the clockwise direction, the field rotor 9 rotates in reverse to the rotational direction of the stator 7, namely, drastically rotates in counterclockwise direction, as shown in FIG. 5A to FIG. 5E. The relationship between the stator 7 and the field rotor 9 has the same operation of the planetary gear mechanism.

(Hybrid Vehicles)

It is possible for hybrid vehicles such as a hybrid electric vehicle to use the double drive shaft motor 1 composed of the stator 7, the field rotor 9 and the magnetic modulation rotor 11 according to the first exemplary embodiment having the structure previously described.

A description will now be given of the effects of the double drive shaft motor 1 used in a hybrid electric motor with reference to FIG. 6A, FIG. 6B, FIG. 7A and FIG. 7B.

The binding device to bind the field rotor 9 with the magnetic modulation rotor 11 and the connection device to connect the field rotor 9 and the magnetic modulation rotor 11 correspond to the field rotor stop device 19, the magnetic modulation rotor stop device 20 and the connection device 21 schematically illustrated in FIG. 1.

(Engine Starter Motor)

Figure 6A:
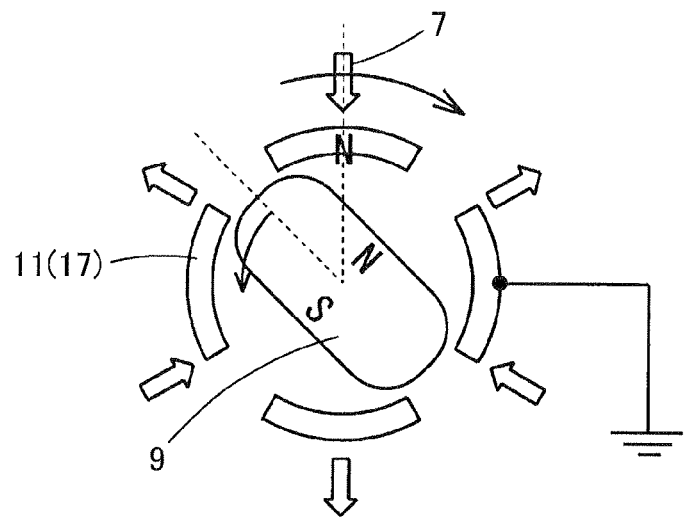
FIG. 6A is a view showing a case in which the double drive shaft motor according to the first exemplary embodiment is used as an engine starter motor in a hybrid vehicle (HV)

FIG. 6A is a view showing a case in which the double drive shaft motor 1 according to the first exemplary embodiment is used as an engine starter motor in a hybrid vehicle (HV).

As shown in FIG. 6A, it is possible to use the double drive shaft motor 1 according to the first exemplary embodiment as an engine starter motor in a hybrid vehicle (HV).

When the magnetic modulation rotor 11 is connected and a rotating magnetic field is supplied from the stator 7 to the magnetic modulation rotor 11, the soft magnetic material members 17 in the magnetic modulation rotor 11 are sequentially magnetically induced, and as a result, the field rotor 9 rotates in the counterclockwise direction which is opposite to the rotating magnetic field. That is, when the field rotor 9 is engaged with an engine shaft of an internal combustion engine of the hybrid vehicle, the double drive shaft motor 1 according to the first exemplary embodiment acts as the engine starter motor.

(HV Driving Mode)

Figure 6B:
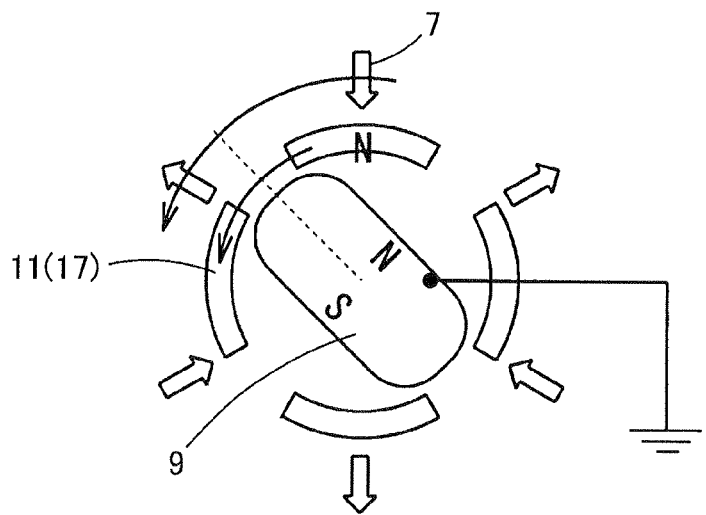
FIG. 6B is a view showing a case in which the double drive shaft motor according to the first exemplary embodiment is used as a driving motor in a hybrid vehicle driving mode in the hybrid vehicle (HV)

FIG. 6B is a view showing a case in which the double drive shaft motor 1 according to the first exemplary embodiment is used as a driving motor used in a hybrid vehicle driving mode in the hybrid vehicle (HV).

As shown in FIG. 6B, it is possible to use the double drive shaft motor 1 according to the first exemplary embodiment as a drive motor in the hybrid vehicle.

The stator 7 generates a magnetic field in a case in which the field rotor 9 and the magnetic modulation rotor 11 are not connected. At this time, when the rotating magnetic field of the stator 7 is driven by a rotating magnetic field which corresponds to a difference in rotation between the field rotor 9 engaged with the engine shaft and the magnetic modulation rotor 11 connected to an axle shaft through the reduction gear device 4, the power of the internal combustion engine and the electric power through the stator 7 are supplied to the magnetic modulation rotor 11, and the those power is supplied to the axle shaft engaged through the reduction gear device 4.

(EV Driving Mode)

Figure 7A:
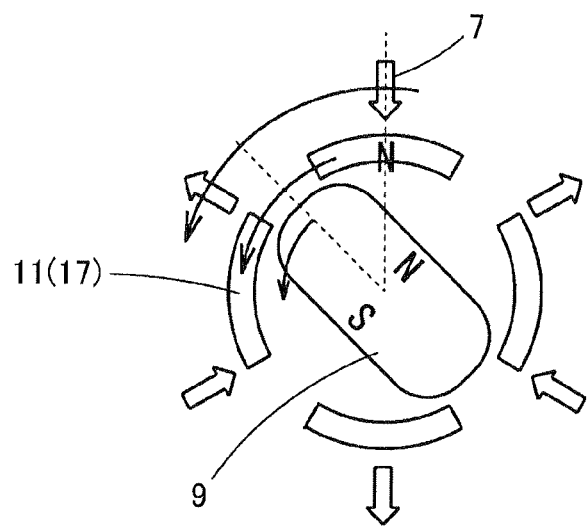
FIG. 7A is a view showing a case in which the double drive shaft motor according to the first exemplary embodiment is used as a drive motor in an electric motor driving in the hybrid vehicle (HV)

FIG. 7A is a view showing a case in which the double drive shaft motor 1 according to the first exemplary embodiment is used as an electric motor used in an electric vehicle (EV) driving mode in the hybrid vehicle (HV).

In the EV driving mode, the internal combustion engine in the hybrid vehicle is stopped. Accordingly, during the EV driving mode, the field rotor 9 in the double drive shaft motor 1 engaged with the engine shaft of the internal combustion engine is connected in order to halt the rotation of the internal combustion engine. Under this situation, when the stator 7 sequentially supplies the magnetic field to the magnetic modulation rotor 11 in order to induce the magnetic modulation rotor 11, the magnetic modulation rotor 11 engaged with the axle shaft starts to rotate. That is, the double drive shaft motor 1 according to the first exemplary embodiment serves as an electric driving motor in the EV driving mode of the hybrid vehicle.

(Regenerative and Brake Mode)

Figure 7B:
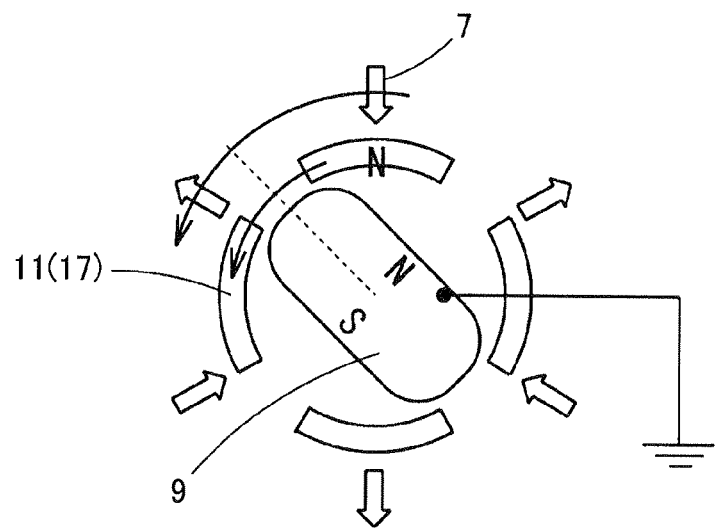
FIG. 7B is a view showing a case in which the double drive shaft motor according to the first exemplary embodiment is used in a regenerative and brake mode in the hybrid vehicle (HV)

FIG. 7B is a view showing a case in which the double drive shaft motor 1 according to the first exemplary embodiment is used in a regenerative and brake mode in the hybrid vehicle (HV).

Similar to the EV driving mode previously described, the field rotor 9 in the double drive shaft motor 1 engaged with the engine shaft of the internal combustion engine is connected in order to halt the rotation of the internal combustion engine. During the regenerative and brake mode, the axle shaft is driven by inertia, namely kinetic energy. The magnetic modulation rotor 11 rotates by the axle shaft driven by inertia because the magnetic modulation rotor 11 is engaged with the axle shaft. When the magnetic modulation rotor 11 is magnetically induced by the rotating magnetic field generated in the stator 7 in order to have the position in which the magnetic modulation rotor 11 generates a resistance to the magnetic poles of the field rotor 9, the magnetic modulation rotor 11 rotates to regenerate regenerative electric power and brake force.

As previously described, the double drive shaft motor 1 according to the first exemplary embodiment has the structure in which the stator 7 and the field rotor 9 are arranged at the radially same side (at the radially outer side in the double drive shaft motor 1 in the first exemplary embodiment) to the magnetic modulation rotor 11 when observed from the magnetic modulation rotor 11. That is, because the stator 7 and the field rotor 9 are arranged in a nested structure through the magnetic modulation rotor 11. This structure makes it possible to prevent the size of the field rotor 9 from being decreased in a limited space in the double drive shaft motor 1. This makes it possible to increase the total amount of the stator winding of the stator 7 and the number of magnets such as the rare earth magnets 16 embedded in the field rotor 9, and as a result to generate a large output torque and to generate large electric power.

Further, because a space can be adequately formed at the radially inner side of the magnetic modulation rotor 11, in which the stator 7 and the field rotor 9 are not arranged, it is possible to arrange the third rotating shaft 5 and the reduction gear device 4 in the space, or it is possible to use the space as a cooling air passage. The structure of the double drive shaft motor 1 according to the first exemplary embodiment makes it possible to provide a high performance and an easy design.

Still further, in the structure of the double drive shaft motor 1 according to the first exemplary embodiment, because the magnetic flux is generated and the generated magnetic field is received at the same side in the double drive shaft motor 1 when the field magnetic flux of the field rotor 9 passes through the magnetic flux paths (the soft magnetic material members 17) in the magnetic modulation rotor 11, eddy currents generated in the supporting members 18 which support the soft magnetic material members 17 cancel each other out when the magnetic flux outputs from and comes through the soft magnetic material members 17. In this case, because such eddy currents do not have a large value in principle, it is possible to tightly fix the soft magnetic material members 17 forming a magnetic flux path by non-magnetized metal members (for example, stainless steel), instead of using insulation material having a weak mechanical strength. That is, because it is possible to tightly fix the soft magnetic material members 17 in the structure of the double drive shaft motor 1 according to the first exemplary embodiment, this structure makes it possible to increase the durability of the magnetic modulation rotor 11, to rotate the double drive shaft motor 1 at a high speed, and to increase the output performance of the double drive shaft motor 1.

Second Exemplary Embodiment

A description will be given of a double drive shaft motor 1A according to a second exemplary embodiment of the present invention with reference to FIG. 8.

Figure 8:
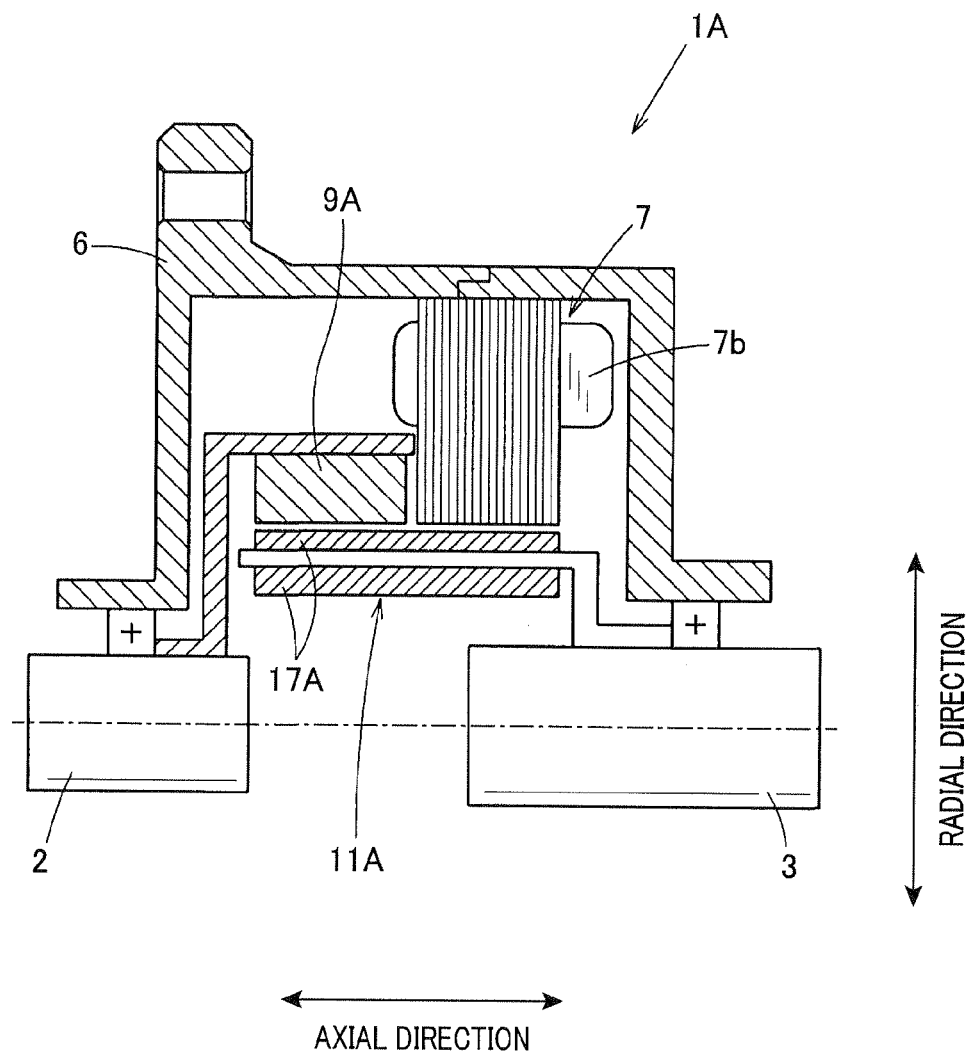
FIG. 8 is a view showing a basic structure of a double drive shaft motor according to a second exemplary embodiment of the present invention.

FIG. 8 is a view showing a basic structure of the double drive shaft motor 1A according to the second exemplary embodiment of the present invention. The same components between the double drive shaft motor 1A according to the second exemplary embodiment and the double drive shaft motor 1 according to the first exemplary embodiment will be designated with the same reference characters and numbers. The explanation of the same components is omitted here for brevity.

As shown in FIG. 8, the field rotor 9A is shifted in a radial direction viewed from the coil end of the stator 7. That is, as shown in FIG. 8, the field rotor 9A is arranged at a radially inside viewed from the coil end of the stator 7. This structure of the double drive shaft motor 1A makes it possible to have the same effects of the double drive shaft motor 1 according to the first exemplary embodiment shown in FIG. 1. In addition to this, because no interference occurs between the coil end of the stator 7 and the field rotor 9A, it is possible to arrange the stator 7 and the field rotor 9A close to each other along an axial direction of the double drive shaft motor 1A. This makes it possible to shorten the longitudinal length of the double drive shaft motor 1A and it is not necessary to reduce the length of the coil end of the stator 7 in order to avoid interference to the field rotor 9A even if the field rotor 9 has a large size.

As a result, it is possible to provide the double drive shaft motor 1A having a compact size and to maintain a high performance and a highly insulation capability.

In the structure of the double drive shaft motor 1A shown in FIG. 8, the magnetic modulation rotor 11A is engaged with the second rotating shaft 3. It is also possible for the double drive shaft motor 1A to have the structure according to the first exemplary embodiment in which the magnetic modulation rotor 11A having the soft magnetic material member 17A is engaged with the third rotating shaft 5, and the third rotating shaft 5 is engaged with the second rotating shaft 3 through the reduction gear device 4.

Third Exemplary Embodiment

A description will be given of a double drive shaft motor 1B according to a third exemplary embodiment of the present invention with reference to FIG. 9.

Figure 9:
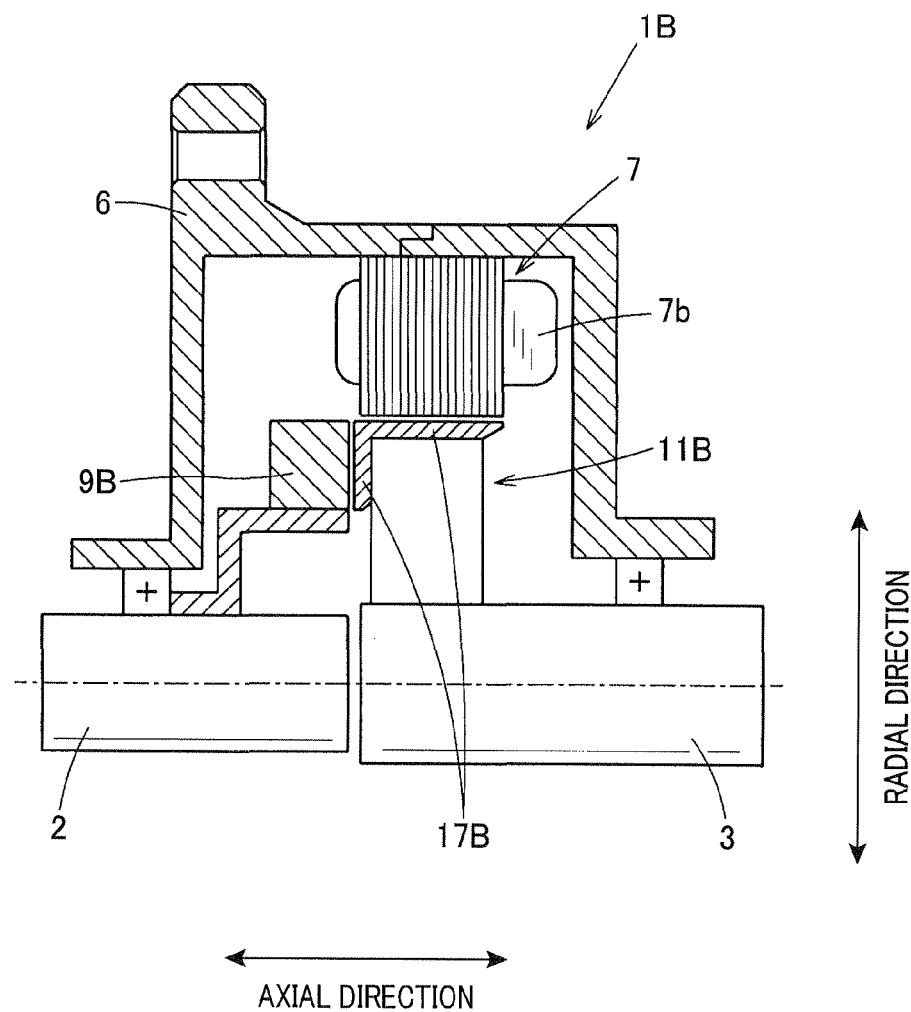
FIG. 9 is a view showing a basic structure of a double drive shaft motor according to a third exemplary embodiment of the present invention.

FIG. 9 is a view showing a basic structure of the double drive shaft motor 1B according to the third exemplary embodiment of the present invention.

The same components between the double drive shaft motor 1B according to the third exemplary embodiment and the double drive shaft motor 1 according to the first exemplary embodiment will be designated with the same reference characters and numbers. The explanation of the same components is omitted here for brevity.

As shown in FIG. 9, the double drive shaft motor 1B according to the third exemplary embodiment has the structure in which the field rotor 9B faces one end surface of the magnetic modulation rotor 11B in an axial direction of the double drive shaft motor 1B. The magnetic modulation rotor 11B has the soft magnetic material members 17B which form the magnetic flux paths at the side which faces the field rotor 9B and at the side which faces the stator 7.

This structure of the double drive shaft motor 1B makes it possible to avoid interference between the stator 7 and the field rotor 9B in an axial direction of the double drive shaft motor 1B. As a result, it is possible to further decrease the longitudinal length of the double drive shaft motor 1B in an axial direction.

In the structure of the double drive shaft motor 1B shown in FIG. 9, like the structure of the second exemplary embodiment, the magnetic modulation rotor 11B is engaged with the second rotating shaft 3. Like the first exemplary embodiment, it is also possible for the double drive shaft motor 1B to have the structure in which the magnetic modulation rotor 11B is engaged with the third rotating shaft 5, and the third rotating shaft 5 is engaged with the second rotating shaft 3 through the reduction gear device 4.

Fourth Exemplary Embodiment

A description will be given of a double drive shaft motor 1C having a field rotor 9C according to a fourth exemplary embodiment of the present invention with reference to FIG. 10.

Figure 10:
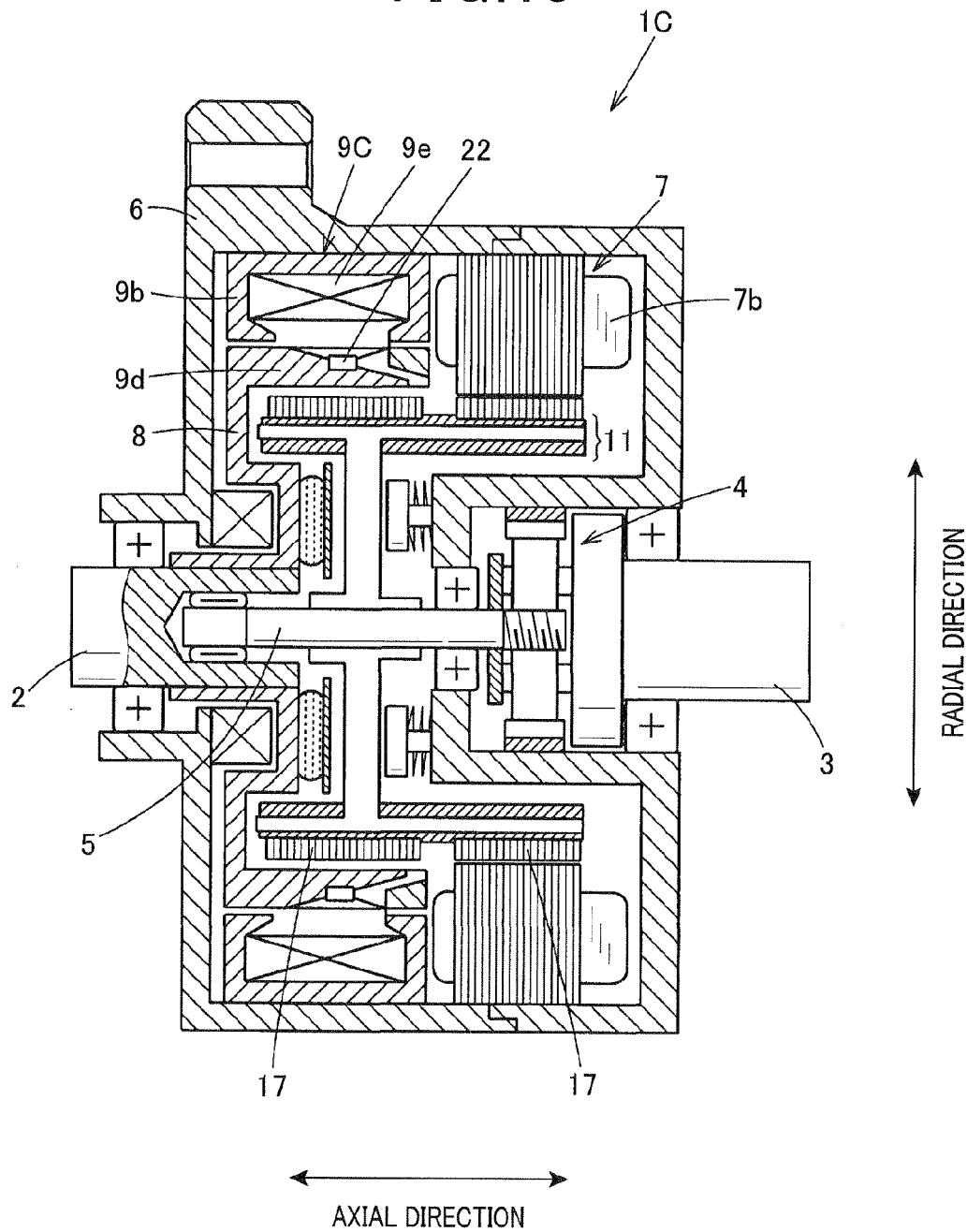
FIG. 10 is a view showing a basic structure of a double drive shaft motor according to a fourth exemplary embodiment of the present invention.

FIG. 10 is a view showing a basic structure of the double drive shaft motor 1C according to the fourth exemplary embodiment of the present invention. The fourth exemplary embodiment uses a brushless rotor as the field rotor 9C.

The same components between the double drive shaft motor 1C according to the fourth exemplary embodiment and the double drive shaft motor 1 according to the first exemplary embodiment will be designated with the same reference characters and numbers. The explanation of the same components is omitted here for brevity.

As shown in FIG. 10, the field rotor 9C in the double drive shaft motor 1C according to the fourth exemplary embodiment is composed of a field iron core 9b, a field coil 9e, and a pair of claw shaped magnetic poles 9d. The field iron core 9b is fixed to the motor housing casing 6. The field coil 9e is wound in the inside of the field iron core 9b. The pair of the claw shaped magnetic poles 9d (field magnetic poles) is arranged to face to each other at the inner side of the field coil 9e.

The pair of the claw shaped magnetic poles 9d is electrically insulated and engaged to each other in a circumferential direction of the field rotor 9C. For example, the pair of the claw shaped magnetic poles 9d is mechanically connected by a ring member 22 made of stainless steel and is connected to the first rotating shaft 2 through the rotor arm 8.

In the structure of the double drive shaft motor 1C according to the fourth exemplary embodiment, when a field current flows in the field coil 9e, and a magnetic field is thereby generated, the claw shaped magnetic poles 9d in each pair are magnetized in an opposite magnetic pole by the generated magnetic field. As a result, the field rotor 9C is rotated by magnetic induction.

Accordingly, it is possible to change the strength of the field magnetic pole by adjusting a field current to be supplied to the field coil 9e. For example, when the first rotating shaft 2 is requested to continue its rotation on the basis of the condition of the internal combustion engine and the axle shaft, and when the double drive shaft motor is required to stop its rotation, it is possible to turn off the field current in order to prevent a friction loss such as an iron loss from being generated by turning off the power supply in order to stop the field current.

(Modifications)

The double drive shaft motor 1 according to the first exemplary embodiment has the stator 7, the field rotor 9 and the magnetic modulation rotor 11. The stator 7 has the three phase winding 7b having the twelve magnetic poles. The field rotor 9 has the twenty field magnetic poles (as the magnets designated by the reference number 16 shown in FIG. 3). The magnetic modulation rotor 11 has the sixteen magnetic flux paths. However, the concept of the present invention is not limited by the structure previously described. For example, the concept of the present invention is not limited by the number of the magnetic poles of the stator 7, the number of the field magnetic poles of the field rotor 9 and the number of the magnetic flux paths in the magnetic modulation rotor 11. That is, it is sufficient to satisfy the following relationship:

$$k=(m+n)/2 \qquad (1),$$

where the reference character "m" is an even number and indicates the number of the magnet poles of the stator 7, the reference character "n" is an even number and indicates the number of the field magnetic poles of the field rotor 9, the reference character "k" indicates the number of the magnetic flux paths in the magnetic modulation rotor 11.

In the structure of the double drive shaft motor 1 according to the first exemplary embodiment, the stator 7 and the field rotor 9 are arranged at the radially outer side of the magnetic field rotor 11. However, the concept of the present invention is not limited by the structure previously described. For example, it is possible to arrange the stator 7 and the field rotor 9 at the radially inner side of the magnetic modulation rotor 11.

Further, the structure of the double drive shaft motor 1 according to the first exemplary embodiment further has the third rotating shaft 5 engaged with the magnetic modulation rotor 11, and the third rotating shaft 5 is engaged with the second rotating shaft 3 through the reduction gear device 4. However, the concept of the present invention is not limited by the structure previously described. For example, it is possible to have a structure in which the first rotating shaft 2 is engaged with the third rotating shaft 5 through the reduction gear device 4.

In addition, in the structure of the double drive shaft motor 1 according to the first exemplary embodiment, the first rotating shaft 2 rotates by the rotation power transmitted from the internal combustion engine of a vehicle and the first rotating shaft 2 is engaged with the field rotor 9. However, the concept of the present invention is not limited by the structure previously described. For example, it is possible to have a structure in which the second rotating shaft 3 engaged with the wheel drive system is engaged with the field rotor 9.

(Other Features and Effects of the Present Invention)

In the double drive shaft motor as another aspect of the present invention, each of the k soft magnetic material members arranged at regular intervals along a circumferential direction is supported by a corresponding supporting member. Each supporting member is made of non-magnetic metal.

It is possible to tightly support the soft magnetic material members forming the magnetic flux paths by the supporting members made of non-magnetic metal, instead of using any insulation member. This makes it possible to increase the durability of the double drive shaft motor and to allow the field rotor and the magnetic modulation rotor to rotate at high speed. It is thereby possible to provide the double drive shaft motor having a high performance such as a highly output torque and power.

In the double drive shaft motor as another aspect of the present invention, each of the soft magnetic material members is composed of a first lamination member and a second lamination member. The first lamination member is made of a plurality of steel plates stacked in an axial direction. The second lamination member is made of a plurality of steel plates stacked in a circumferential direction. The first lamination member is arranged in the magnetic modulation rotor to face the stator and the field rotor. The second lamination member is arranged at the opposite area of the first lamination member in the magnetic modulation rotor. The first lamination member is arranged in contact with the second lamination member.

For example, when a field magnetic flux is transmitted between the magnetic modulation rotor and the stator through the soft magnetic material members arranged in the magnetic modulation rotor, the soft magnetic material members receive the magnetic field which is generated and changed by the rotation of the field rotor in a lamination direction (for example, in a circumferential direction). Accordingly, the structure of the double drive shaft motor makes it possible to provide the field magnetic flux to the stator in a radially direction, and this makes it possible to easily provide the magnetic flux and to decrease iron loss.

The double drive shaft motor as another aspect of the present invention further has a first rotating shaft, a second rotating shaft, a third drive shaft, and a transmission device. The first rotating shaft rotates by receiving a rotation power transmitted from an internal combustion engine of a hybrid vehicle. The second rotating shaft is engaged with a wheel drive system of the hybrid vehicle. The third drive shaft is engaged with the magnetic modulation rotor. Through the transmission device, the third rotating shaft is engaged with the first rotating shaft or the second rotating shaft. The field rotor is engaged with one of the first rotating shaft and the second rotating shaft. The stator and the field rotor are arranged at a radially outer side of the magnetic modulation rotor to form a space in a radially inner side of the magnetic modulation rotor. At lease a part of the transmission device is arranged in the space formed at the radially inner side of the magnetic modulation rotor.

Because the double drive shaft motor according to the present invention has the structure in which the rotor and the field rotor are arranged at a radially outer side of the magnetic modulation rotor, it is possible to arrange the stator winding and the magnets with an adequate margin and to increase the amount of stator winding and magnets to be arranged in the double drive shaft motor when compared with that of the structure in which the rotor and the field rotor are arranged at a radially inner side of the magnetic modulation rotor. This makes it possible to increase the output torque and power of the double drive shaft motor.

Still further, because at least a part of the transmission device is arranged in the space formed in the inner side of the magnetic modulation rotor in the double drive shaft motor according to the present invention, it is possible to output a large torque even if the longitudinal length of the double drive shaft motor is shortened. This makes it possible to mount the double drive shaft motor to a vehicle having a limited engine space.

In the double drive shaft motor as another aspect of the present invention, the field rotor is a brushless rotor. The brushless rotor has a fixed field coil and a plurality of pairs of claw pole magnetic poles in which each pair of the claw poles is magnetized in an opposite magnetic direction by magnetic field generated by the field coil.

In this structure, because the claw pole magnetic poles (field magnetic poles) are magnetized by the magnetic field generated by the field coil, it is possible to adjust the strength of the field magnetic poles by adjusting the magnitude of the field current supplied to the field coil. For example, when the rotating shaft engaged with the field rotor is requested to continue its rotation on the basis of the condition of the internal combustion engine and the axle shaft, and when the double drive shaft motor is required to stop its rotation, it is possible to turn off the field current in order to prevent a friction loss such as an iron loss from being generated by turning off the power supply in order to stop the field current.

The double drive shaft motor as another aspect of the present invention further has a first stop device, a second stop device and a connection device. The first stop device is arranged between the motor housing casing and the field rotor. The stator is fixed to the motor housing casing. The first stop device supports and stops the field rotor in the motor housing casing. The second stop device is arranged between the motor housing casing and the magnetic modulation rotor, supports and stops the magnetic modulation rotor in the motor housing casing. The connection device is arranged between the field rotor and the magnetic modulation rotor to connect the field rotor with the magnetic modulation rotor.

On mounting the double drive shaft motor having the structure previously described to a hybrid vehicle, it is possible to use the double drive shaft motor in various operation modes of a transaxle in the hybrid vehicle.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A double drive shaft motor of a magnetic flux modulation type comprising:

a magnetic modulation rotor comprising a plurality of soft magnetic material members forming magnetic flux paths arranged at regular intervals in a circumferential direction of the magnetic modulation rotor;

a stator having a multi-phase winding of m magnetic poles, where m is an even number, facing the magnetic modulation rotor and being arranged at one of a radially inner side and a radially outer side of the magnetic modulation rotor so that the stator faces the magnetic modulation rotor; and a field rotor having a plurality of n field magnetic poles, where n is an even number, arranged at the radially same side of the stator, as the magnetic modulation rotor so that the field rotor and the stator are axially arranged in series, wherein the soft magnetic material members of the magnetic modulation rotor are arranged along a circumferential direction of the magnetic modulation rotor at regular intervals to radially face the stator and the field rotor, and the stator, the field rotor and the magnetic modulation rotor satisfy the following relationship:

$$k=(m+n)/2, \qquad (1),$$

where k is the number of the soft magnetic material members.

2. A double drive shaft motor of a magnetic flux modulation type comprising:

a magnetic modulation rotor comprising a plurality of soft magnetic material members forming magnetic flux paths arranged at regular intervals in a circumferential direction of the magnetic modulation rotor;

a stator having a multi-phase winding of m magnetic poles, where m is an even number, facing the magnetic modulation rotor and being arranged at one of a radially inner side and a radially outer side of the magnetic modulation rotor so that the stator faces the magnetic modulation rotor; and a field rotor having a plurality of n field magnetic poles, where n is an even number, arranged at an axially end surface of the magnetic modulation rotor so that the field rotor and the stator being axially arranged in series, wherein the soft magnetic material members of the magnetic modulation rotor are arranged along a circumferential direction of the magnetic modulation rotor at regular intervals to radially face the stator and the field rotor, and the stator, the field rotor and the magnetic modulation rotor satisfy the following relationship:

$$k=(m+n)/2, \qquad (1),$$

where k is the number of the soft magnetic material members.

3. The double drive shaft motor according to claim 1, wherein the k soft magnetic material members arranged at regular intervals along a circumferential direction are supported by supporting members made of non-magnetic metal, respectively.

4. The double drive shaft motor according to claim 2, wherein the k soft magnetic material members arranged at regular intervals along a circumferential direction are supported by supporting members made of non-magnetic metal, respectively.

5. The double drive shaft motor according to claim 1, wherein each of the soft magnetic material members is composed of a first lamination member and a second lamination member, the first lamination member is made of a plurality of steel plates stacked in an axial direction, the second lamination member is made of a plurality of steel plates stacked in a circumferential direction, the first lamination member is arranged in the magnetic modulation rotor to face the stator and the field rotor and the second lamination member is arranged at the opposite area of the first lamination member in the magnetic modulation rotor, and the first lamination member is arranged in contact with the second lamination member.

6. The double drive shaft motor according to claim 2, wherein each of the soft magnetic material members is composed of a first lamination member and a second lamination member, the first lamination member is made of a plurality of steel plates stacked in an axial direction, the second lamination member is made of a plurality of steel plates stacked in a circumferential direction, the first lamination member is arranged in the magnetic modulation rotor to face the stator and the field rotor and the second lamination member is arranged at the opposite area of the first lamination member in the magnetic modulation rotor, and the first lamination member is arranged in contact with the second lamination member.

7. The double drive shaft motor according to claim 1, further comprises:

a first rotating shaft which rotates by receiving a rotation power transmitted from an internal combustion engine of a vehicle;

a second rotating shaft engaged with a wheel drive system of the vehicle;

a third drive shaft engaged with the magnetic modulation rotor; and a transmission device to connect the third rotating shaft to one of the first rotating shaft and the second rotating shaft, wherein the field rotor is engaged with one of the first rotating shaft and the second rotating shaft, the stator and the field rotor are arranged at a radially outer side of the magnetic modulation rotor to form a space in a radially inner side of the magnetic modulation rotor, and at lease a part of the transmission device is arranged in the space formed at the radially inner side of the magnetic modulation rotor.

8. The double drive shaft motor according to claim 1, wherein the field rotor is a brushless rotor comprising:

a fixed field coil; and a plurality of pairs of claw pole magnetic poles in which the claw poles in each pair are magnetized in an opposite magnetic direction by magnetic field generated by the field coil.

9. The double drive shaft motor according to claim 2, wherein the field rotor is a brushless rotor comprising:

a fixed field coil; and a plurality of pairs of claw pole magnetic poles in which the claw poles in each pair are magnetized in an opposite magnetic direction by magnetic field generated by the field coil.

10. The double drive shaft motor according to claim 1, further comprising:

a first stop device arranged between the motor housing casing and the field rotor, the stator being fixed to the motor housing casing, the first stop device supporting and stopping the field rotor in the motor housing casing;

a second stop device arranged between the motor housing casing and the magnetic modulation rotor, supporting and stopping the magnetic modulation rotor in the motor housing casing; and a connection device arranged between the field rotor and the magnetic modulation rotor to connect the field rotor with the magnetic modulation rotor.

11. The double drive shaft motor according to claim 2, further comprising:

a first stop device arranged between the motor housing casing and the field rotor, the stator being fixed to the motor housing casing, the first stop device supporting and stopping the field rotor in the motor housing casing;

a second stop device arranged between the motor housing casing and the magnetic modulation rotor, supporting and stopping the magnetic modulation rotor in the motor housing casing; and a connection device arranged between the field rotor and the magnetic modulation rotor to connect the field rotor with the magnetic modulation rotor.

* * * * *